United States Patent
Hayashi

(10) Patent No.: US 9,520,814 B2
(45) Date of Patent: Dec. 13, 2016

(54) BONDING METHOD, MOUNTING TABLE AND SUBSTRATE PROCESSING APPARATUS

(71) Applicant: Tokyo Electron Limited, Tokyo (JP)

(72) Inventor: Daisuke Hayashi, Miyagi (JP)

(73) Assignee: TOKYO ELECTRON LIMITED, Tokyo (JP)

(*) Notice: Subject to any disclaimer, the term of this patent is extended or adjusted under 35 U.S.C. 154(b) by 187 days.

(21) Appl. No.: 14/158,916

(22) Filed: Jan. 20, 2014

(65) Prior Publication Data

US 2014/0202618 A1    Jul. 24, 2014

Related U.S. Application Data

(60) Provisional application No. 61/759,493, filed on Feb. 1, 2013.

(30) Foreign Application Priority Data

Jan. 21, 2013   (JP) ................ 2013-008555

(51) Int. Cl.
   *H02N 13/00*      (2006.01)

(52) U.S. Cl.
   CPC .................. *H02N 13/00* (2013.01)

(58) Field of Classification Search
   CPC ................................. H02N 13/00
   USPC ........................................ 156/153
   See application file for complete search history.

(56) References Cited

U.S. PATENT DOCUMENTS

| | | | |
|---|---|---|---|
| 6,351,367 B1* | 2/2002 | Mogi | B25B 11/002 361/234 |
| 8,252,132 B2* | 8/2012 | Yoshioka | H01L 21/67132 156/169 |
| 8,982,530 B2* | 3/2015 | Lin | B32B 3/04 361/234 |
| 2005/0215073 A1* | 9/2005 | Nakamura | H01L 21/67103 438/778 |
| 2008/0266746 A1* | 10/2008 | Handa | H01L 21/6831 361/234 |

FOREIGN PATENT DOCUMENTS

| | | | |
|---|---|---|---|
| JP | 2001-240953 A | | 9/2001 |
| JP | 2003-193216 A | | 7/2003 |
| JP | 2006-013302 A | | 1/2006 |
| JP | 2008-047885 A | | 2/2008 |
| JP | 2009-71023 A | * | 4/2009 |
| JP | 2011-176275 A | | 9/2011 |
| JP | 5094863 B2 | | 9/2012 |

* cited by examiner

*Primary Examiner* — Jeff Aftergut
(74) *Attorney, Agent, or Firm* — Pearne & Gordon LLP

(57) ABSTRACT

A distance between the surface of the base member and the electrostatic chuck having the heater pattern formed on a bottom surface thereof can be uniformized. A bonding method of bonding an electrostatic chuck and a base member to each other includes forming a filling member 30 by covering irregularities of a heater pattern 9a formed on a bottom surface 61 of the electrostatic chuck 9 facing the base member 10; grinding a base member contact surface 62 of the filling member 30 facing the base member 10; and bonding the ground base member contact surface 62 of the filling member 30 to the base member 10 with an adhesive layer 31 provided therebetween.

8 Claims, 5 Drawing Sheets

BONDING METHOD, MOUNTING TABLE AND SUBSTRATE PROCESSING APPARATUS

CROSS-REFERENCE TO RELATED APPLICATION

This application claims the benefit of Japanese Patent Application No. 2013-008555 filed on Jan. 21, 2013, and U.S. Provisional Application Ser. No. 61/759,493 filed on Feb. 1, 2013, the disclosures of which are incorporated herein by reference.

TECHNICAL FIELD

The various embodiments described herein pertain generally to a bonding method, a mounting table and a substrate processing apparatus.

BACKGROUND

Conventionally, an electrostatic chuck is fixed on a surface of a base member. For example, there is known a method of, by using an organic adhesive, bonding a bottom surface of the electrostatic chuck having a heater pattern formed thereon to an insulating member provided on a surface of the base member via a sheet-shaped adhesive resin.

Patent Document 1: Japanese Patent Laid-open Publication No. 2011-176275

Patent Document 2: Japanese Patent Laid-open Publication No. 2001-240953

Patent Document 3: Japanese Patent Laid-open Publication No. 2003-193216

However, the above-described method has a problem. That is, if a thickness of the organic adhesive is not uniform, a distance between the surface of the base member and the electrostatic chuck having the heater pattern formed on the bottom surface thereof may also become non-uniform.

SUMMARY

In view of the foregoing problem, example embodiments provide a bonding method of boding an electrostatic chuck and a base member to each other. In one example embodiment, the bonding method includes forming a filling member by covering irregularities of a heater pattern formed on a bottom surface of the electrostatic chuck facing the base member; grinding a base member contact surface of the filling member facing the base member; and bonding the ground base member contact surface of the filling member to the base member with an adhesive layer provided therebetween.

In one example embodiment, a bonding method of bonding an electrostatic chuck and a base member to each other includes forming a filling member by covering irregularities of a heater pattern formed on a bottom surface of the electrostatic chuck facing the base member; grinding a base member contact surface of the filling member facing the base member; and bonding the ground base member contact surface of the filling member to the base member with an adhesive layer provided therebetween.

The filling member may have thermal conductivity ranging from about 0.2 W/mK to about 30 W/mK and breakdown voltage ranging from about 5 kV/mm to about 20 kV/mm.

The adhesive layer may have a sheet shape.

The filling member may be formed by spraying a mixture of resin and ceramic particles onto the bottom surface of the electrostatic chuck, and, then, sintering the sprayed mixture.

In another example embodiment, a mounting table includes a base member; an electrostatic chuck; a heater pattern formed on a bottom surface of the electrostatic chuck facing the base member; a filling member that covers irregularities of the heater pattern and has a ground base member contact surface facing the base member; and an adhesive layer that bonds the base member contact surface of the filling member and the base member to each other.

In still another example embodiment, a substrate processing apparatus includes a mounting table that includes a base member; an electrostatic chuck; a heater pattern formed on a bottom surface of the electrostatic chuck facing the base member; a filling member that covers irregularities of the heater pattern and has a ground base member contact surface facing the base member; and an adhesive layer that bonds the base member contact surface of the filling member and the base member to each other.

In accordance with the bonding method described above, it is possible to uniformize a distance between the surface of the base member and the electrostatic chuck having the heater pattern formed on the bottom surface thereof.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

In the detailed description that follows, embodiments are described as illustrations only since various changes and modifications will become apparent from the following detailed description. The use of the same reference numbers in different figures indicates similar or identical items.

DETAILED DESCRIPTION

Figure 1:
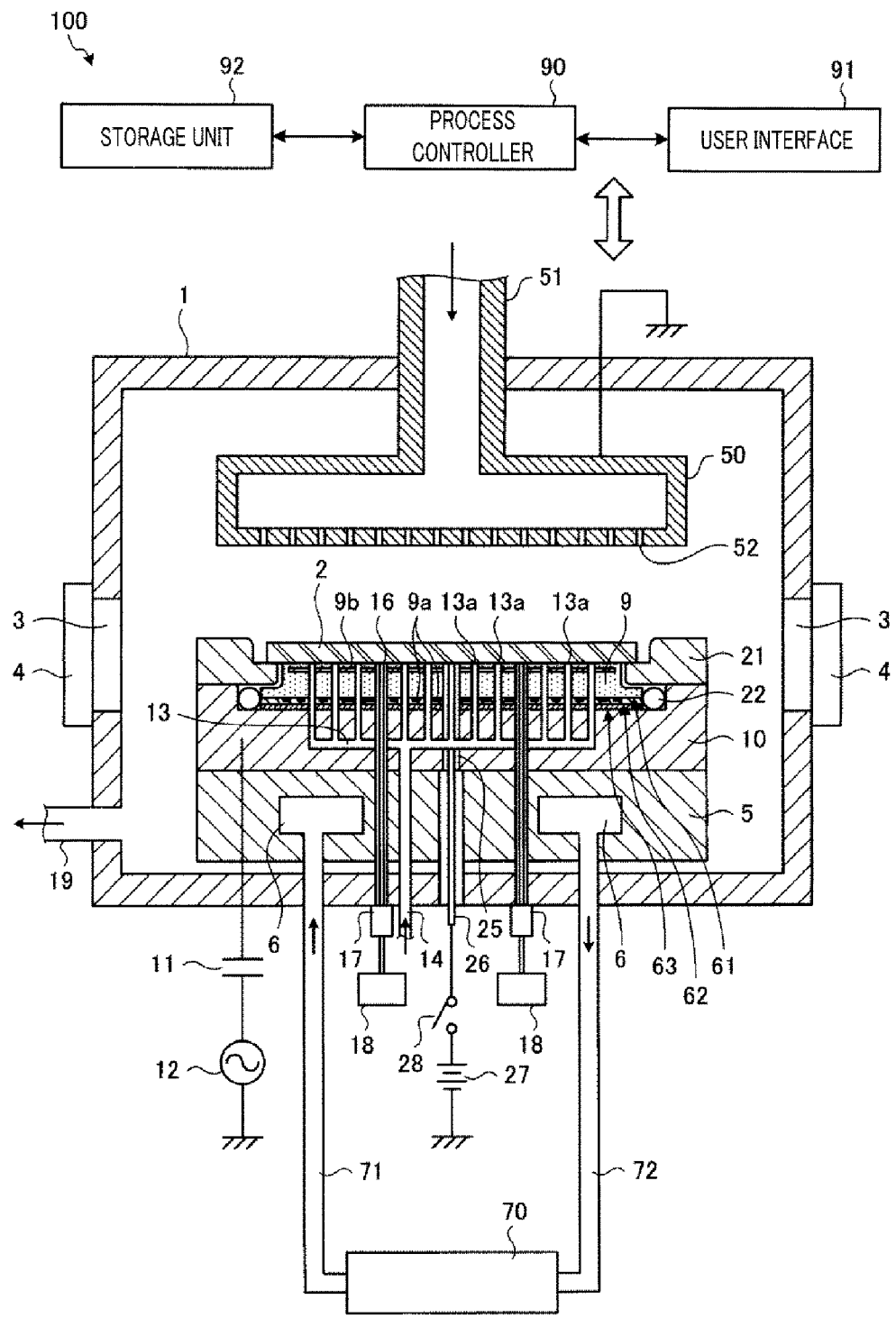
FIG. 1 is a cross sectional view showing a schematic configuration of an example plasma etching apparatus in accordance with a first example embodiment.

Hereinafter, a bonding method, a mounting table and a substrate processing apparatus in accordance with example embodiments will be described in detail with reference to the accompanying drawings, which form a part of the description. The example embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein and illustrated in the drawings, may be arranged, substituted, combined, separated, and designed in a wide variety of different configurations, all of which are explicitly contemplated herein.

(Example Configuration of Substrate Processing Apparatus in the First Example Embodiment)

An example configuration of a substrate processing apparatus in accordance with a first example embodiment will be described. In the following description, a plasma etching apparatus is described as an example of the substrate processing apparatus. However, the example embodiment may not be limited thereto. Specifically, the substrate processing apparatus may be implemented by any apparatus including a mounting table that includes a base member; an electrostatic chuck; a heater pattern formed on a bottom surface of the electrostatic chuck facing the base member; a filling member that covers irregularities of the heater pattern and has a ground base member contact surface facing the base member; and an adhesive layer that bonds the base member contact surface of the filling member and the base member to each other.

Figure 2:
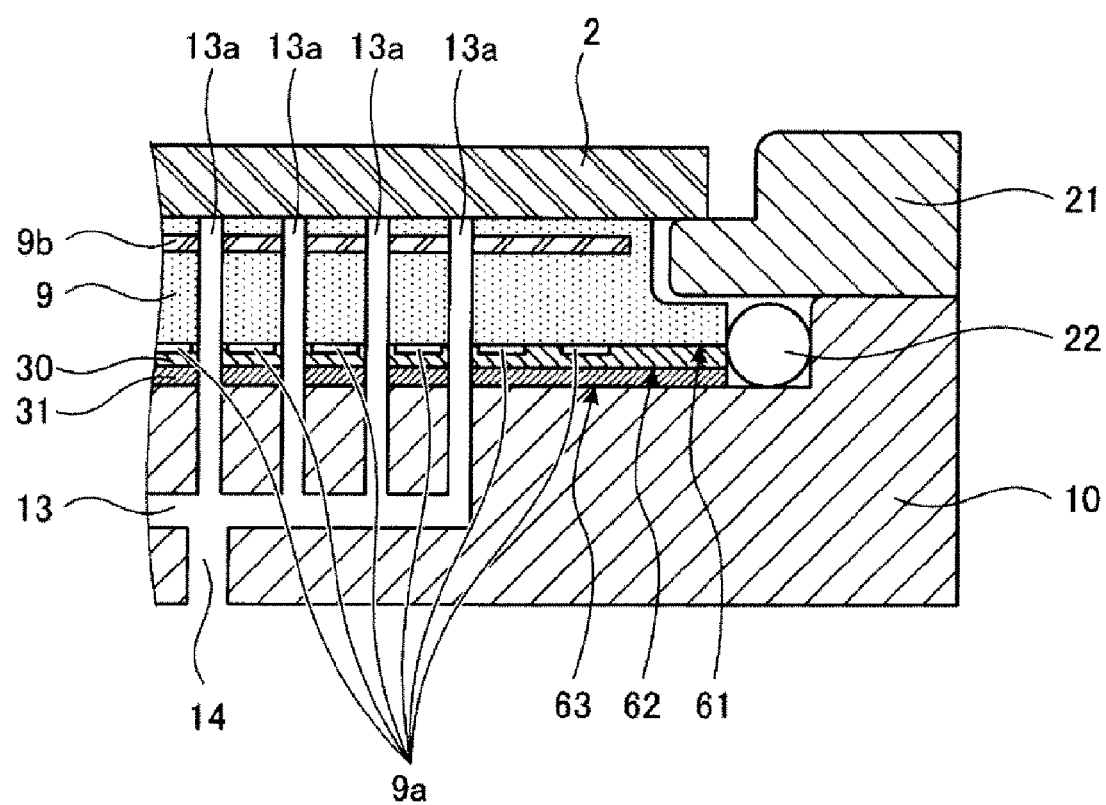
FIG. 2 is a cross sectional view showing an example of a positional relationship among a semiconductor wafer, an electrostatic chuck, a susceptor, a focus ring and a sealing member in the first example embodiment.

FIG. 1 is a cross sectional view illustrating a schematic configuration of the plasma etching apparatus in accordance with the first example embodiment. FIG. 2 is a cross sectional view showing an example of positional relationship among a semiconductor wafer, an electrostatic chuck, a susceptor, a focus ring and a sealing member in the first example embodiment.

As depicted in FIG. 1, the plasma etching apparatus 100 includes a chamber 1. The chamber 1 has an outer wall made of conductive aluminum. In the example shown in FIG. 1, the chamber 1 has an opening 3 through which a semiconductor wafer 2 is loaded into or unloaded from the chamber 1; and a gate valve 4 which can be opened or closed via an air-tightly sealing member. The sealing member may be, but not limited to, an O-ring.

Though not shown in FIG. 1, a load lock chamber is connected to the chamber 1 via the gate valve 4, and a transfer device is provided in the load lock chamber. The transfer device is configured to load and unload the semiconductor wafer 2 into and from the chamber 1.

An exhaust opening 19 through which the chamber 1 is evacuated is formed in a lower portion of a sidewall of the chamber 1. The exhaust opening 19 is connected to a non-illustrated vacuum exhaust device via an opening/closing valve such as, but not limited to, a butterfly valve. The vacuum exhaust device may be, for example, a rotary pump, a turbo molecular pump, or the like.

As depicted in FIG. 1, the plasma etching apparatus 100 further has a base member supporting table 5 at a central bottom portion of the chamber 1. The plasma etching apparatus 100 also includes a base member 10 placed on a top of the base member supporting table 5. As depicted in FIG. 1 and FIG. 2, the plasma etching apparatus 100 also includes an electrostatic chuck 9 placed on a top of the base member 10. Further, the plasma etching apparatus 100 also includes a focus ring 21 provided on a top of the base member 10 member to surround the electrostatic chuck 9.

As depicted in FIG. 1 and FIG. 2, a periphery of the base member 10 is higher than a central portion of the base member 10 on which the electrostatic chuck 9 is provided. Hereinafter, the periphery of the base member 10, which is higher than the central portion of the base member 10 on which the electrostatic chuck 9 is provided, is referred to as a peripheral protruding portion. As depicted in FIG. 2, the plasma etching apparatus 100 further includes a sealing member 22 in contact with at least two of a side surface of the electrostatic chuck 9, the peripheral protruding portion of the base member 10 and a bottom surface of the susceptor. The sealing member 22 may be, for example, an O-ring.

In addition, the plasma etching apparatus 100 also includes an upper electrode 50 at an upper portion of the chamber 1 to be located above the base member 10. The upper electrode 50 is electrically grounded. A processing gas is supplied into the upper electrode 50 through a gas supply line 51. The processing gas is discharged toward the semiconductor wafer 2 through a multiple number of small holes 52 radially formed in a bottom wall of the upper electrode 50. Here, a high frequency power supply 12 is turned ON, so that plasma of the discharged processing gas is generated between the upper electrode 50 and the semiconductor wafer 2. Further, the processing gas may be, but not limited to, $CHF_3$, $CF_4$ or the like.

Hereinafter, each component of the plasma etching apparatus 100 will be further described. The base member supporting table 5 is made of a conductive material such as aluminum and is formed in a cylindrical shape. A coolant jacket 6 that stores a coolant therein is formed within the base member supporting table 5. A flow path 71 through which the coolant is introduced into the coolant jacket 6 and a flow path 72 through which the coolant is discharged from the coolant jacket 6 are connected to the coolant jacket 6. The flow paths 71 and 72 are hermetically formed through a bottom surface of the chamber 1.

In the following, although the example embodiment will be described for the case where the coolant jacket 6 is provided within the base member supporting table 5, the exemplary embodiment may not be limited thereto. By way of example, the coolant jacket 6 may be provided within the base member 10. As will be described later, as the coolant is circulated through the coolant jacket 6 by a chiller unit 70, a temperature of the base member 10 and/or a temperature of the base member supporting table 5 are controlled.

The base member 10 provided on the top of the base member supporting table 5 is made of a conductive material such as aluminum (Al) (Al has a linear thermal expansion coefficient of about $23.5 \times 10^{-6}$/K) and serves as a lower electrode. The base member 10 is fastened on the base member supporting table 5 by non-illustrated bolts. As cold heat of the coolant jacket 6 is transferred to the base member 10 via the base member supporting table 5, the base member 10 is cooled. The base member 10 is connected to the high frequency power supply 12 via a blocking capacitor 11. The high frequency power supply 12 supplies a high frequency power of, e.g., about 13.56 MHz, about 40 MHz or the like.

The electrostatic chuck 9 is made of, but not limited to, a ceramic material (having a linear thermal expansion coefficient of, e.g., about $7.1 \times 10^{-6}$/K). The electrostatic chuck 9 has an electrode plate 9b therein. The semiconductor wafer 2 is mounted on a top surface of the electrostatic chuck 9. Further, as will be described later, a heater pattern 9a is formed on a bottom surface 61 of the electrostatic chuck 9 facing the base member 10.

As depicted in FIG. 1, the electrode plate 9b is connected to one end of a conductive line 25. The other end of the conductive line 25 is connected to a power supply rod 26. The conductive line 25 is enclosed by an insulator such as Teflon (registered trademark) embedded in the base member 10. The power supply rod 26 is made of, but not limited to, copper and is configured to supply a high voltage ranging from about 200 V to about 3 kV. The power supply rod 26 is penetrated through the bottom surface of chamber 1 hermetically while insulated from the chamber 1 and is connected to a high voltage power supply 27 via an electronic switch 28. The electronic switch 28 is turned ON or OFF in response to a non-illustrated control signal that controls the apparatus.

Further, through holes 16 are formed through the base member 10, the base member supporting table 5 and the electrostatic chuck 9. A pusher pin which is electrically grounded via a resistor or an inductor is provided in each through hole 16. The pusher pin is connected to an air cylinder 18 via an expansible/contractible bellows 17 which seals the chamber 1 hermetically. The pusher pin is moved up and down by the air cylinder 18 when the semiconductor wafer 2 is transferred from/to the transfer device of the load lock chamber, and when the semiconductor wafer 2 is brought into contact with the electrostatic chuck 9 or is separated therefrom.

A multiple number of through holes 13a for uniformly supplying a heat transfer medium to a rear surface of the semiconductor wafer 2 is formed through the base member 10 and the electrostatic chuck 9. The through holes 13a are connected to a gas storage room 13 allowing a pressure of a He gas applied to the through holes 13a to be uniform. The gas storage room 13 is connected to a supply line 14 through which the heat transfer medium is introduced into the chamber 1 from an outside thereof. The heat transfer medium may be, but not limited to, a He gas, which is an inert gas. However, the heat transfer medium may not be limited thereto.

As depicted in FIG. 1, the plasma etching apparatus 100 includes the chiller unit 70 configured to circulate the coolant through the coolant jacket 6. Specifically, the chiller unit 70 supplies the coolant into the coolant jacket 6 through the flow path 71 and receives the coolant discharged from the coolant jacket 6 through the flow path 72.

Figure 3:
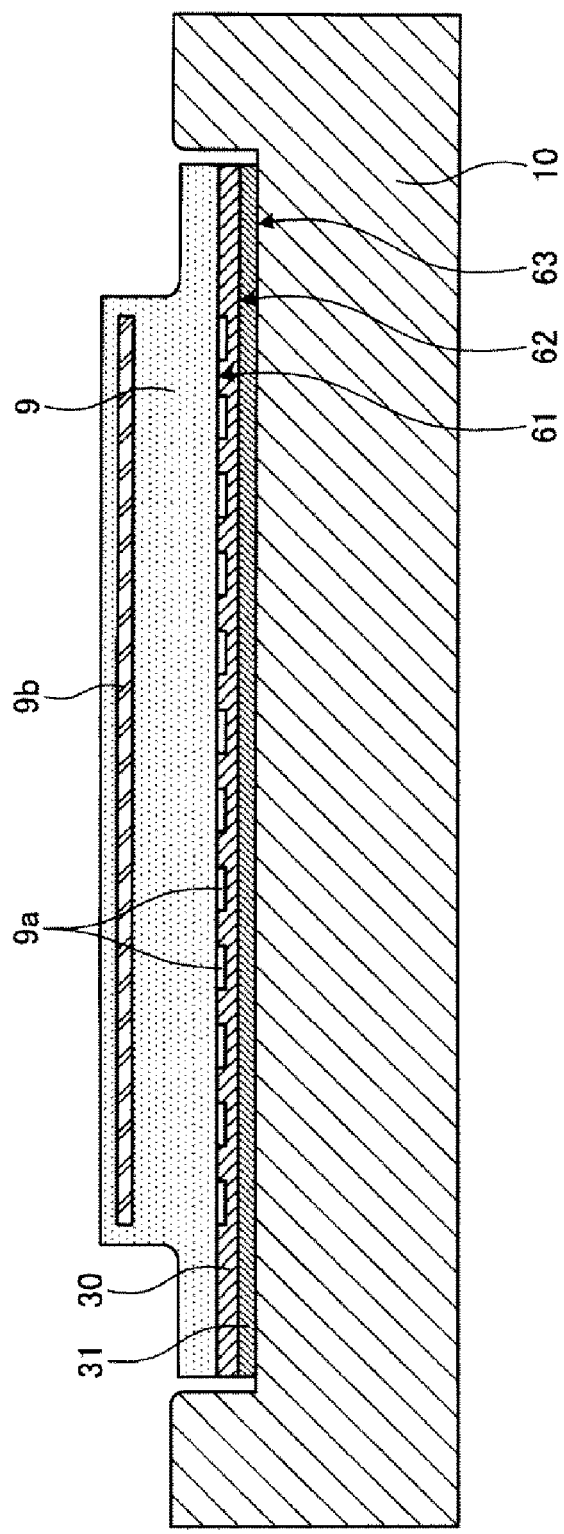
FIG. 3 is a diagram further illustrating a base member and the electrostatic chuck in the first example embodiment.

FIG. 3 is a diagram further illustrating the base member and the electrostatic chuck in the first example embodiment. In the example shown in FIG. 3, the sealing member 22 and the through holes 13a are not depicted for the convenience of illustration. As depicted in FIG. 3, in the plasma etching apparatus 100, the heater pattern 9a is formed on the bottom surface 61 of the electrostatic chuck 9 facing the base member 10. The heater pattern 9a is formed by forming a pattern of a certain metal on the bottom surface 61. For example, the heater pattern 9a may be formed by attaching a titanium thin film having a certain pattern to the bottom surface 61.

As depicted in FIG. 3, the plasma etching apparatus 100 has a filling member 30 that covers irregularities of the heater pattern 9a. A surface of the filling member 30 facing the base member 10, i.e., a base member contact surface 62 of the filling member 30 is ground. The filling member 30 may be, for example, a thermally sprayed ceramic-based material using alumina, $Y_2O_3$ or the like, a heat-resistant resin-based material, a hard rubber-based material, or the like, which can be cut. The base member contact surface 62 is ground as a smooth surface.

Thermal conductivity of the filling member 30 may be in the range from, e.g., about 0.2 W/mK to about 30 W/mK, and, desirably, in the range from, e.g., about 1 W/mK to about 10 W/mK. Breakdown voltage of the filling member 30 may be in the range from, e.g., about 5 kV/mm to about 20 kV/mm or in the range from, e.g., about 7 kV/mm to about 15 kV/mm. Desirably, the filling member 30 may be used at a temperature ranging from, e.g., about 0° C. to about 120° C., and, more desirably, ranging from, e.g., about 30° C. to about 80° C.

Here, the filling member 30 is formed by spraying a mixture of resin and ceramic particles onto the bottom surface 61 and sintering it. By way of example, the filling member 30 may be formed by coating a mixture of thermoplastic epoxy resin and particles of an oxide such as $Al_2O_3$ or $SiO_2$ on the bottom surface 61 of the electrostatic chuck 9 on which the heater pattern 9a is formed and, then, heat-curing the coated mixture. A particle diameter of the ceramic particle may be, but not limited to, about 5 μm to about 50 μm.

Here, a mixing ratio of the resin and the ceramic particles used in forming the filling member 30 may be, for example, resin:ceramic particles=about 70 to about 150:about 20 to about 80, and, more desirably, about 90 to about 120:about 30 to about 40. However, the mixing ratio may not be limited thereto but varied as required. The sintering process is performed by heating the mixture at a temperature ranging from, e.g., about 70° C. to about 120° C. under the atmosphere for about one hour in an electric furnace. When spraying the mixture of the resin and the ceramic particles onto the bottom surface 61, a slurry spraying method using compressed air may be used, for example. In addition, the method for grinding the base member contact surface 62 of the filling member 30 may not be particularly limited.

A more specific example of forming the filling member 30 will be described. By way of example, a mixture of about 70 wt % of epoxy resin and about 30 wt % of $SiO_2$ particles having a particle diameter of, e.g., about 30 μm is sprayed onto the bottom surface 61 of the electrostatic chuck 9 by using a compressed air spray gun. Then, the electrostatic chuck 9 is loaded into the electric furnace and sintered at a temperature of, e.g., about 80° C. for about one hour, so that the filling member 30 is formed. Thereafter, the filling member 30 is ground.

As another non-limiting example, the filling member 30 may be formed by spraying a mixture of a polymer material such as epoxy-based resin, imide-based resin, phenolic resin or fluorine-based resin and ceramic powder or cermet powder onto the bottom surface 61, and, then, sintering the mixture. The mixture is sprayed onto the bottom surface 61 of the electrostatic chuck 9 by brushing, dipping, spraying, thermal spraying, or the like. To elaborate, in order to enhance adhesion of the filling member 30 to overlying and underlying layers, about 5 vol % to about 60 vol % of ceramic particles or carbide cermet powder having an average particle diameter of, e.g., about 5 μm to about 200 μm is mixed to an organic polymer material, and this mixture is sprayed and coated on the bottom surface 61 of the electrostatic chuck 9. Then, to improve stability of the organic polymer material, heat treatment is performed at a temperature ranging from, e.g., about than 60° C. to about 200° C., so that the filling member 30 is formed.

By way of example, the filling member 30 may be formed by spraying the mixture of about 70 vol % of epoxy resin and about 30 vol % of $SiO_2$ particles (30 μm) onto the bottom surface 61 of the electrostatic chuck 9 through a compressed air spray gun; loading the electrostatic chuck 9 into the electric furnace; and heat-treating the electrostatic chuck 9 at about 80° C. under the atmosphere for about two hours. As another example, the filling member 30 may be formed by coating a mixture of about 50 vol % of polyimide resin and about 50 vol % of $Al_2O_3$ particles (40 μm) onto the bottom surface 61 of the electrostatic chuck 9 with a coating brush; loading the electrostatic chuck 9 into the electric furnace; heat-treating the electrostatic chuck 9 at about 180° C. under the atmosphere for about ten hours.

As depicted in FIG. 3, the plasma etching apparatus 100 has an adhesive layer 31 that bonds the base member contact surface 62 of the filling member 30 and the base member 10 to each other. That is, the adhesive layer 31 bonds a surface 63 of the base member 10 and the ground base member contact surface 62 to each other, so that the base member 10 and the electrostatic chuck 9 are joined to each other. The adhesive layer 31 may be made of, for example, a sheet-shaped adhesive. Desirably, the adhesive layer 31 may be a sheet-shaped adhesive having excellent thickness stability.

Figure 4:
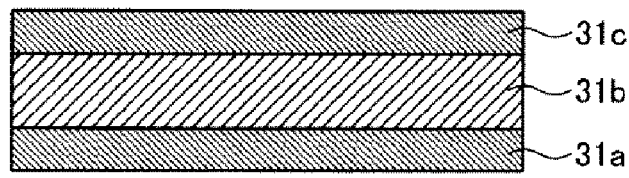
FIG. 4 is a diagram illustrating an example structure of an adhesive layer in the first example embodiment.

FIG. 4 illustrates an example structure of the adhesive layer in the first example embodiment. In the example depicted in FIG. 4, the adhesive layer 31 is made of a sheet-shaped adhesive. Specifically, the adhesive layer 31 includes a first adhesive layer 31a, a stress relaxing layer 31b, and a second adhesive layer 31c stacked on top of each other. The first adhesive layer 31a and the second adhesive layer 31c are bonded to the surface 63 of the base member 10 and the base member contact surface 62 of the filling member 30, respectively. The first adhesive layer 31a and the second adhesive layer 31c may be, for example, acrylic rubber. However, the first adhesive layer 31a and the second adhesive layer 3c may not be limited thereto, and the kind of the adhesive may not be particularly limited. The stress relaxing layer 31b may be made of, for example, a non-cured flexible material such as, but not limited to, a mixture of acrylic rubber and epoxy resin. In this way, by using the adhesive layer 31 having the stress relaxing layer 31b made of such a non-cured flexible material, it is possible to absorb inclination upon compression when the base member 10 and the electrostatic chuck 9 are bonded to each other by the adhesive layer 31. Accordingly, it is possible to maintain a uniform pressure in the entire bonded surfaces. As a result, it is possible to more uniformize the distance between the base member 10 and the electrostatic chuck 9, as compared to a case of using an adhesive layer without a stress relaxing layer 31b. Further, by using the adhesive layer 31 having the stress relaxing layer 31b, it may be possible to absorb a displacement in a horizontal direction and to suppress the base member 10 and the electrostatic chuck 9 from being separated due to a difference in their volume expansions caused by a temperature variation.

(Control Device for Plasma Etching Apparatus in the First Example Embodiment)

Each component of the plasma etching apparatus 100 is connected to and controlled by a process controller 90 having a CPU. The process controller 90 is connected to a user interface 91 including a keyboard through which a process manager inputs commands to manage the plasma etching apparatus 100, a display which visually displays an operational status of the plasma etching apparatus 100, and so forth.

In addition, the process controller 90 is also connected to a storage unit 92 that stores therein control programs for implementing various processes performed in the plasma etching apparatus 100 under the control of the process controller 90 or recipes including process condition data, etc.

Further, in response to an instruction from the user interface 91 or the like, a necessary recipe is retrieved from the storage unit 92 and executed by the process controller 90, so that a desired process can be performed in the plasma etching apparatus 100 under the control of the process controller 90. The recipe may be used while being stored on a computer-readable storage medium such as a CD-ROM, a hard disk, a flexible disk or a flash memory, or may be received from another apparatus through, e.g., a dedicated line, whenever necessary. The process controller 90 may also be referred to as a "control unit." In addition, the function of the process controller 90 may be implemented by using software or hardware.

(Bonding Method in the First Example Embodiment)

Figure 5:
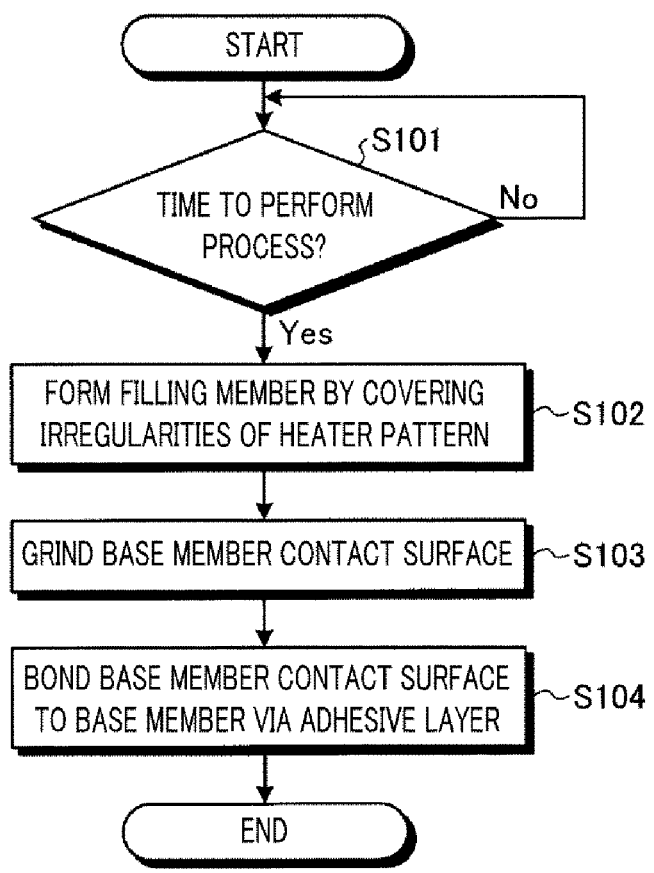
FIG. 5 is a flowchart showing a sequence of a bonding method of bonding the electrostatic chuck and the base member in the first example embodiment.

FIG. 5 is a flowchart showing an example sequence of the bonding method of bonding the electrostatic chuck and the base member in the first example embodiment.

As depicted in FIG. 5, at block S101 (time to perform process), in the bonding method of bonding the electrostatic chuck 9 and the base member 10 in the first example embodiment, when it is time to perform a process (Yes in block S101), at block S102 (form filling member by covering irregularities of heater pattern), the filling member 30 is formed by covering the irregularities of the heater pattern 9a formed on the bottom surface 61 of the electrostatic chuck 9 facing the base member 10. For example, a mixture of about 70 wt % of epoxy resin and about 30 wt % of $SiO_2$ particles having a particle diameter of, e.g., about 30 μm is sprayed onto the bottom surface 61 of the electrostatic chuck 9 with a compressed air spray gun. Then, the electrostatic chuck 9 is loaded into the electric furnace and subjected to heat-curing at about 80° C. under the atmosphere for about one hour.

Then, at block S103 (grind base member contact surface), the base member contact surface 62 of the filling member 30 facing the base member 10 is ground. That is, by grinding the base member contact surface 62, the base member contact surface 62 is made smooth and plane.

Subsequently, at block S104 (bond base member contact surface to base member via adhesive layer), the ground base member contact surface 62 of the filling member 30 is bonded to the base member 10 via the adhesive layer 31. That is, by bonding the surface 63 of the base member 10 and the ground base member contact surface 62, the base member 10 and the electrostatic chuck 9 are bonded to each other.

(Effects of the First Example Embodiment)

As described above, the bonding method in accordance with the first example embodiment is to bond the electrostatic chuck 9 and the base member 10 to each other. In one example of the first example embodiment, the filling member 30 is formed by covering the irregularities of the heater pattern 9a formed on the bottom surface 61 of the electrostatic chuck 9 facing the base member 10, and the base member contact surface 62 of the filling member 30 facing the base member 10 is ground. Then, the ground base member contact surface 62 of the filling member 30 is bonded to the base member 10 via the adhesive layer 31. As a result, it is possible to uniformize a distance between the surface of the base member 10 and the electrostatic chuck 9 having the heater pattern 9a formed on the bottom surface 61 thereof.

Here, it may be assumed that a heater pattern is embedded in an electrostatic chuck and a bottom surface of the electrostatic chuck facing a base member is a plane surface. In this case, it may be possible to uniformize a distance between the base member and the electrostatic chuck by using, for example, a sheet-shaped adhesive. However, since the heater pattern is embedded in the electrostatic chuck, changing a previously set condition may be difficult and require costs. In addition, it may also be assumed that a heater pattern is formed on a bottom surface of an electrostatic chuck facing a base member and the bottom surface of the electrostatic chuck and the base member are bonded to each other by a liquid adhesive such as a silicon adhesive.

In such a case, however, a uniform distance between the base member and the electrostatic chuck may not be achieved.

Figure 6:
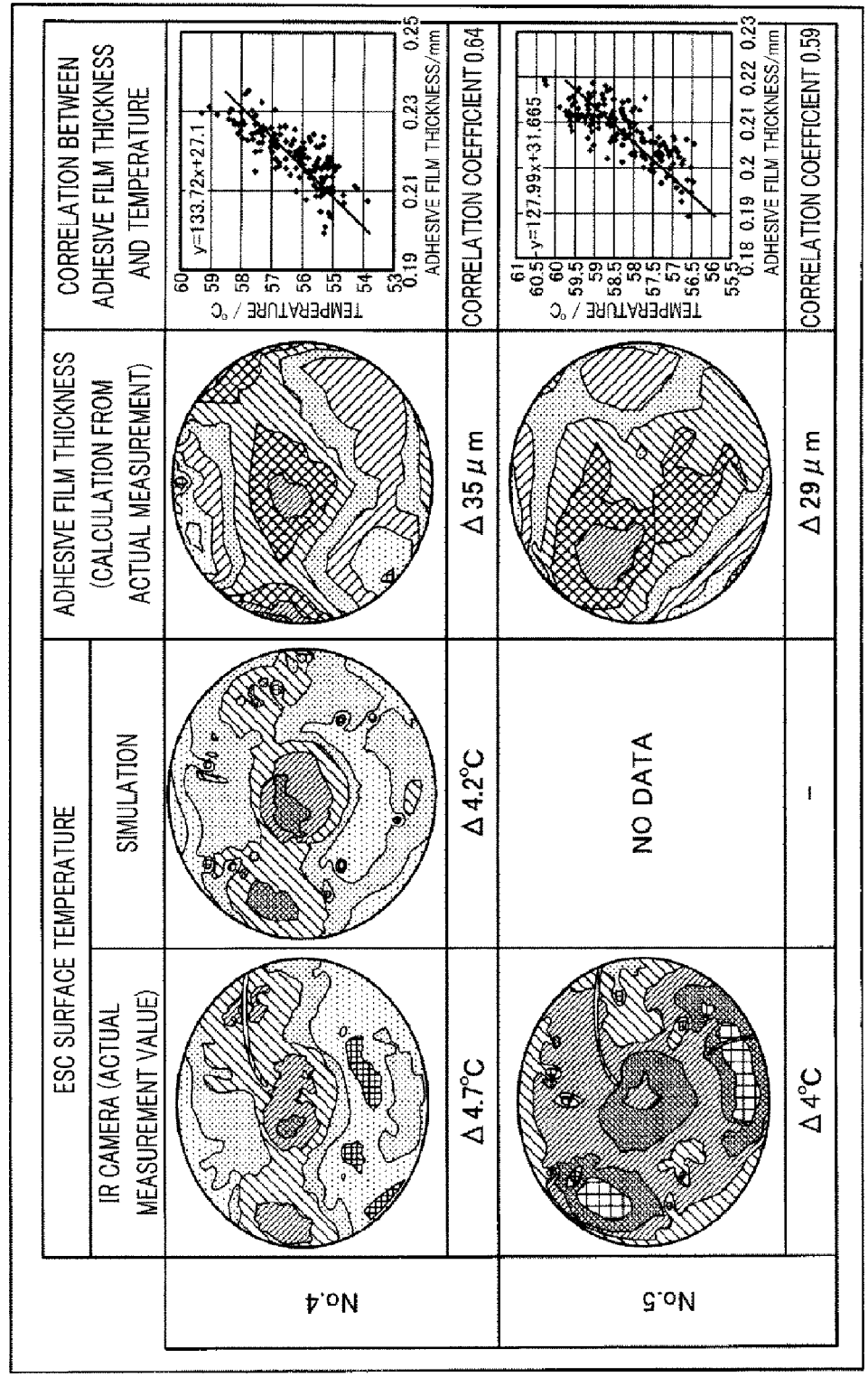
FIG. 6 shows a diagram illustrating a case of bonding, by using a liquid adhesive, a base member and an electrostatic chuck having a heater pattern formed on a bottom surface thereof.

FIG. 6 is a diagram illustrating a case of bonding a base member and an electrostatic chuck having a heater pattern formed on a bottom surface thereof by using a liquid adhesive. In FIG. 6, 'ESC surface temperature' indicates a surface temperature of the electrostatic chuck when viewed from an upper electrode. In FIG. 6, 'IR camera (actual measurement value)' indicates an actual measurement value obtained by an IR (infrared) camera. In FIG. 6, 'simulation' indicates a value obtained from simulation. In FIG. 6, 'adhesive film thickness (calculation from actual measurement)' indicates a thickness of a liquid adhesive obtained from actual measurement. In FIG. 6, 'correlation between adhesive film thickness and temperature' indicates a correlation between the thickness of an adhesive film and a temperature difference.

As depicted in FIG. 6, in case of using the liquid adhesive, thickness differences between the thinnest portion and the thickest portion of the adhesive film is about '35 μm' and about '29 μm.' In addition, temperature differences between the highest surface temperature portion and the lowest surface temperature portion are about '4.7° C.' and about '4° C.' In addition, as depicted in FIG. 6, it is found out that the film thickness and the temperature difference are correlated with each other.

As described above, as compared to the case where the heater pattern is embedded in the electrostatic chuck, or the case of bonding the base member and the electrostatic chuck having the heater pattern formed on the bottom surface thereof by using the liquid adhesive, it is possible to uniformize the distance between the base member and the electrostatic chuck in a simple way in accordance with the first example embodiment. That is, since the heater pattern 9a is not embedded, design modification can be easily made. Thus, by bonding the ground base member contact surface 62 and the base member 10 to each other, it is possible to uniformize the distance between the surface of the base member 10 and the electrostatic chuck 9 having the heater pattern 9a formed on the bottom surface 61 thereof.

In addition, in one example of the first example embodiment, the filling member 30 has thermal conductivity in the range from, e.g., about 0.2 W/mK to about 30 W/mK and breakdown voltage in the range from, e.g., about 5 kV/mm to about 20 kV/mm. As a result, even when the filling member 30 is provided in the substrate processing apparatus, the filling member 30 can be appropriately used therein.

In addition, in one example of the first example embodiment, the adhesive layer 31 is a sheet-shaped adhesive. As a result, it is possible to make the distance between the base member and the electrostatic chuck more uniform.

In addition, in one example of the first example embodiment, the filling member 30 is formed by spraying a mixture of resin and ceramic particles onto the bottom surface of the electrostatic chuck, and then, heat-curing the mixture. As a result, it is possible to appropriately form the filling member 30 that meets the requirements for the ranges of the thermal conductivity and the breakdown voltage.

In addition, a mounting table in accordance with the first example embodiment includes the base member 10; the electrostatic chuck 9; the heater pattern 9a formed on the bottom surface 61 of the electrostatic chuck 9 facing the base member 10; the filling member 30 that covers the irregularities of the heater pattern 9a and has the ground base member contact surface 62 facing the base member 10; and the adhesive layer 31 bonding the base member contact surface 62 of the filling member 60 and the base member 10.

As a result, the distance between the surface of the base member 10 and the electrostatic chuck 9 having the heater pattern 9a formed on the bottom surface 61 thereof can be uniformed. Accordingly, it is possible to perform a process on the semiconductor wafer 2 at a constant temperature.

In addition, the substrate processing apparatus in accordance with the first example embodiment includes the mounting table having the base member 10; the electrostatic chuck 9; the heater pattern 9a formed on the bottom surface 61 of the electrostatic chuck 9 facing the base member 10; the filling member 30 that covers the irregularities of the heater pattern 9a and has the ground base member contact surface 62 facing the base member 10; and the adhesive layer 31 bonding the base member contact surface 62 of the filling member 60 and the base member 10. As a result, the distance between the surface of the base member 10 and the electrostatic chuck 9 having the heater pattern 9a formed on the bottom surface 61 thereof can be uniformized. Accordingly, it is possible to perform a process on the semiconductor wafer 2 at a constant temperature.

(Other Example Embodiments)

In the above, the bonding method, the mounting table and the substrate processing apparatus in accordance with the first example embodiment have been described. However, the present disclosure may not be limited thereto, and other example embodiments will be described below.

In the example depicted in FIG. 4, the adhesive layer 31 has the stress relaxing layer 31b. However, the adhesive layer 31 may not be limited thereto. By way of example, the adhesive layer 31 may have a hard core material, rather than the non-cured flexible material, between the first adhesive layer 31a and the second adhesive layer 31c. In this case, it is possible to reduce costs, as compared to the case of providing the non-cured flexible stress relaxing layer 31b in the adhesive layer. In addition, the material for the stress relaxing layer 31b may be determined based on erosion resistance to a used gas.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

I claim:

1. A mounting table, comprising:
a base member having a peripheral protruding portion formed at a periphery of the base member such that the peripheral protruding portion is higher than a central portion of the base member;
an electrostatic chuck provided on the central portion of the base member;
a heater pattern formed on a bottom surface of the electrostatic chuck facing the base member;
a filling member that covers irregularities of the heater pattern and has a ground base member contact surface facing the base member;
an adhesive layer that bonds the base member contact surface of the filling member and the base member to each other; and
a sealing member provided at an outer peripheral portion of the filling member and the adhesive layer, and is in contact with a side surface of the peripheral protruding portion of the base member.

2. A bonding method of bonding an electrostatic chuck and a base member to each other, the bonding method comprising:
   forming a filling member by covering irregularities of a heater pattern formed on a bottom surface of the electrostatic chuck facing the base member;
   grinding a base member contact surface of the filling member facing the base member; and
   bonding the ground base member contact surface of the filling member to the base member with an adhesive layer provided therebetween,
   wherein the base member has a peripheral protruding portion formed at a periphery of the base member such that the peripheral protruding portion is higher than a central portion of the base member on which the electrostatic chuck is provided, and
   a sealing member is provided at an outer peripheral portion of the filling member and the adhesive layer, and is in contact with a side surface of the peripheral protruding portion of the base member.

3. The bonding method of claim 2, wherein the filling member has thermal conductivity ranging from about 0.2 W/mK to about 30 W/mK and breakdown voltage ranging from about 5 kV/mm to about 20 kV/mm.

4. The bonding method of claim 2, wherein the adhesive layer has a sheet shape.

5. The bonding method of claim 2, wherein the filling member is formed by spraying a mixture of resin and ceramic particles onto the bottom surface of the electrostatic chuck, and, then, sintering the sprayed mixture.

6. The bonding method of claim 2, wherein the sealing member is an O-ring.

7. The bonding method of claim 2, wherein the adhesive layer includes a first adhesive layer, a stress relaxing layer and a second adhesive layer stacked on top of each other, such that the stress relaxing layer is disposed between the first adhesive layer and the second adhesive layer.

8. A substrate processing apparatus, comprising:
   a mounting table including:
   a base member having a peripheral protruding portion formed at a periphery of the base member such that the peripheral protruding portion is higher than a central portion of the base member;
   an electrostatic chuck provided on the central portion of the base member;
   a heater pattern formed on a bottom surface of the electrostatic chuck facing the base member;
   a filling member that covers irregularities of the heater pattern and has a ground base member contact surface facing the base member;
   an adhesive layer that bonds the base member contact surface of the filling member and the base member to each other; and
   a sealing member provided at an outer peripheral portion of the filling member and the adhesive layer, and is in contact with a side surface of the peripheral protruding portion of the base member.

* * * * *

UNITED STATES PATENT AND TRADEMARK OFFICE
CERTIFICATE OF CORRECTION

PATENT NO. : 9,520,814 B2
APPLICATION NO. : 14/158916
DATED : December 13, 2016
INVENTOR(S) : Hayashi It is certified that error appears in the above-identified patent and that said Letters Patent is hereby corrected as shown below:

In the Specification

Column 7, Line 23, replace "3c" with -- 31c --.

Signed and Sealed this
Eighteenth Day of July, 2017

Joseph Matal
*Performing the Functions and Duties of the*
*Under Secretary of Commerce for Intellectual Property and*
*Director of the United States Patent and Trademark Office*